United States Patent [19]

Wehr

[11] Patent Number: 4,470,115

[45] Date of Patent: Sep. 4, 1984

[54] INPUT/OUTPUT METHOD

[75] Inventor: Larry A. Wehr, Piscataway, N.J.

[73] Assignee: Bell Telephone Laboratories Incorporated, Murray Hill, N.J.

[21] Appl. No.: 357,799

[22] Filed: Mar. 12, 1982

[51] Int. Cl.³ .............................................. G06F 9/00
[52] U.S. Cl. .................................................... 364/300
[58] Field of Search ................ 364/200 MS File, 300, 364/900 MS File

[56] References Cited

U.S. PATENT DOCUMENTS 4,229,790 10/1980 Gilliland et al. ..................... 364/200

Primary Examiner—Raulfe B. Zache

Attorney, Agent, or Firm—S. J. Phillips

[57] ABSTRACT

An improved computer program method for rapidly copying data that operates in a time-shared operating system environment. Two concurrent computer program processes are employed, each copying data from the input device to the output device through its own memory buffer. The two processes communicate with one another through interprocess communication means provided by the operating system in order to coordinate their activity. As a result, double buffered overlapped input/output is achieved using only synchronous input/output commands provided by the operating system.

9 Claims, 5 Drawing Figures

SINGLE PROCESS

CONCURRENT PROCESSES

INPUT/OUTPUT METHOD

BACKGROUND OF THE INVENTION

1. Technical Field

This invention relates to data processing and more particularly to an improved computer program method for performing overlapped input/output.

2. Description of the Prior Art

A task frequently performed in a computing center is to copy data from one input/output device to another in bulk quantity. For example, it is frequently necessary to copy the entire contents of a disc pack to magnetic tape. In many computing centers, a back-up copy of the contents of all disc storage is made periodically in order to permit the restoration of disc pack contents in the event of computer malfunction or human error.

For disc packs of large capacity, transferring the entire contents can consume significant amounts of time measured in minutes or perhaps even house, depending upon the average data transfer rate. The hardware design of the computer system places an upper limit on the maximum transfer rate. However, the effective average transfer rate is usually less than this hardware-imposed limit because of delays inherent in the computer program that performs the copy. It is desirable that this copy program be carefully designed to reduce copy delays.

In many computer systems, input/output ("I/O") devices are grouped for data transfer purposes under separate hardware controllers. Typically, for example, a number of disc storage devices is provided with a disc controller while a number of tape devices is provided with a separate tape controller. Some computer systems may have several disc controllers, or several tape controllers, each with its own group of associated I/O devices. Each controller typically transfers data directly into or out of main memory at a high transfer rate by direct memory access, each controller acting independently of the others so that I/O transfer by two or more controllers may occur simultaneously. In a case where two independent controllers are employed, as is generally the case for disc-to-tape or tape-to-disc copy, it is advantageous to use two data buffers in main memory in order to achieve time overlap of the read and the write operations. Data is being read into the first buffer area while data is simultaneously being written out from the second buffer area.

It is usually advantageous for the data buffers to be relatively large in size so that data transfer takes place in large segments. Since the copy program then is called upon to intervene less frequently, overhead associated with the copy program such as disc latency delays may be reduced.

In order to perform double-buffered overlapped I/O in the manner described, it is usually necessary that the computer system provide facilities for the copy program to issue asynchronous I/O requests. An asynchronous request is one which causes the requested I/O operation to begin, with control continuing in the requesting program while the requested operation is taking place. Given this facility, the copy program can proceed in the following straightforward prior art manner. The copy program issues a request to read from a first device into a first buffer area. This activity is begun, and control continues in the copy program which then issues a request to write to a second device from a second buffer area. Overlap of input and output has been achieved; control again continues in the copy program which then may proceed to other matters.

Performing asynchronous I/O requests and employing large amounts of memory for buffer space is generally not a problem when the copy program is in direct control of the hardware resources as is the case, for example, with a specialized stand-alone copy program. Asynchronous I/O is a facility generally provided by the computer system hardware, and the total available space in memory is typically adequate for two large data buffers. However, a stand-alone program for copying may displace a general purpose time-shared operating system that supplies service to a number of users. Generally, it is not desirable for the normal users of a computer system to halt their activities, even temporarily, while copying is done. In most installations it is a requirement that the copy program operate as a user program within the environment of the general purpose operating system. Then the copy program may be utilized by normal system users, and copying can take place contemporaneous with other user activity. However, the memory space available to a user program may restrict the buffer size. Further, many general purpose time-shared operating systems provide only synchronous I/O. Thus a read request will not return control to the user program until the read has been completed and the information read is in memory. Under these circumstances it may not be possible, in the prior art, to attain overlapped operation.

SUMMARY OF THE INVENTION

The present invention provides double-buffered overlapped I/O to rapidly copy data from one I/O device to another while using synchronous I/O commands. A novel computer program method is employed that operates within the confines of a user program in the environment provided by a time-shared operating system. This method utilizes two concurrently running computer programs ("processes"), each of which reads and writes the two I/O devices, but in a cooperative manner that avoids interference and achieves overlap of the read and write operations. Each of the two processes provides a data buffer within the memory space allotted to it by the operating system. This simplifies the operation of each process since each administers only a single buffer, while permitting the maximum size of each of the two buffers to approach the total memory space allotted to each single user process. To effect the needed cooperation, the two concurrently running processes communicate with one another upon completion of each buffer read or write step using interprocess communication facilities provided by the operating system.

An attached APPENDIX shown an illustrative computer program that operates in accordance with the present invention.

DETAILED DESCRIPTION

Figure 1:
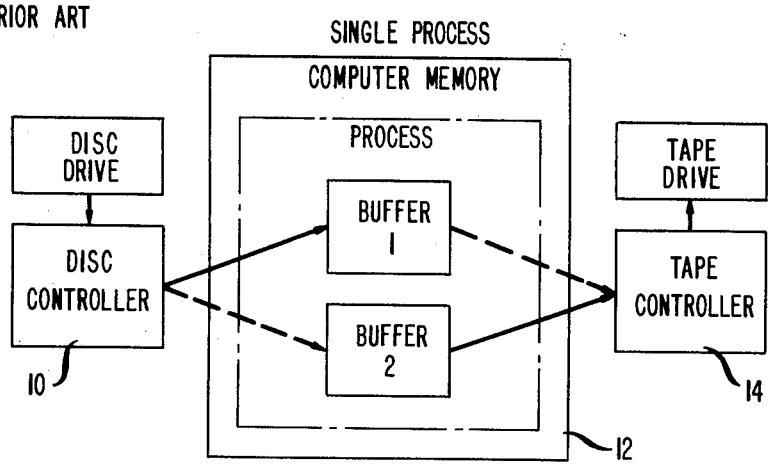
FIG. 1 is a block diagram of a computer system operating with a prior art input/output method.

FIG. 1 is a block diagram of a computer system that performs double buffered overlapped input/output according to the prior art. Disc controller 10 transfers data from disc into buffer 1, an area of computer memory 12, by direct memory access. Simultaneously, tape controller 14 transfers data by direct memory access from buffer 2 to tape. Alternately, controller 10 writes into buffer 2 while controller 14 is reading from buffer 1. As one buffer is being filled, the other buffer is being emptied permitting overlapped operation by the two controllers.

Copying from disc to tape takes place under control of a computer program that occupies a portion of memory 12. This copy program may be stand-alone, that is, the sole occupant of memory 12 with direct control over controllers 10 and 14, or the copy program may be one process administered by a time-shared operating system that occupies a major portion of memory 12. Such an operating system is a permanent resident of memory 12 that serves multiple users by scheduling multiple processes and allocating resources such as controllers 10 and 14, among the processes. In the environment of a multi-process time-shared operating system the copy process exerts control over controllers 10 and 14 indirectly by issuing requests to the operating system. It is in this time-shared environment that the present invention finds its greatest utility.

In the present context, a computer program process or simply "process" is a term of art meaning an individual instance of an operating computer program that is performing a function. For example, a computer system may have a single program that prints payroll checks. However, in the time-shared environment the check printing program may be invoked three times, giving rise to three different processes that simultaneously and independently print payroll checks for employees with names in three different parts of the alphabet.

Figure 2:
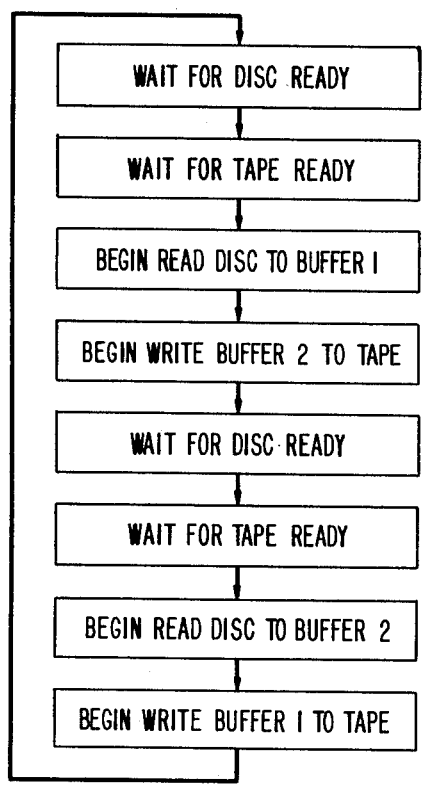
FIG. 2 is a flow chart of the prior art method used in FIG. 1.

FIG. 2 is a flow diagram that details the prior art single-process computer program method used in FIG. 1. Read and write requests are asynchronous so that return to the process is immediate and the process must explicitly wait for completion.

The process of FIG. 2 begins by waiting for both disc and tape controllers to finish prior activity and to be in a ready condition. The process requests a read of data from disc to buffer 1 and a write from buffer 2 to tape, and waits for both to complete. In a stand-alone program, the central processor may stand idle by executing completion tests repeatedly. In a time-shared operating system, more typically, the process would be placed on a wait queue while other tasks are performed. In any event, the process waits for both disc and tape completion since transfer can proceed no faster than the slower of the two devices. After both are ready, the process issues a read from disc to buffer 2 and a write from buffer 1 to tape followed by another wait for disc and tape ready. The process loops and repeats as necessary until all data are transferred. Certain details are omitted from FIG. 2 such as initialization, end-of-file and termination.

Figure 3:
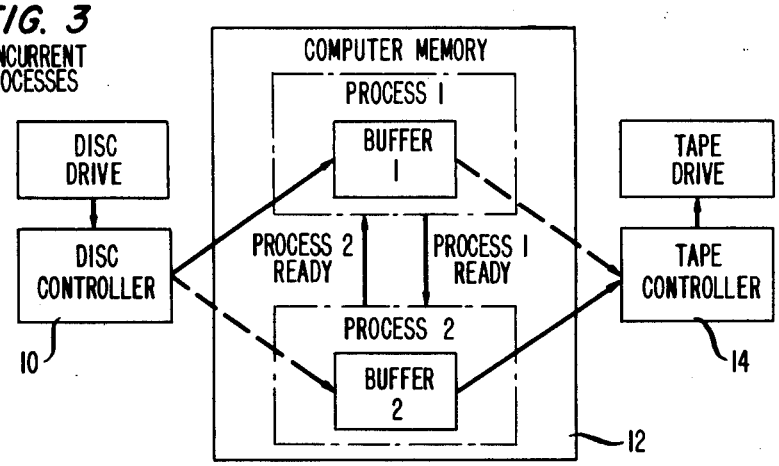
FIG. 3 is a block diagram of a computer system operating with an illustrative embodiment of an input/output method according to the present invention.

FIG. 3 is a computer system that operates in accordance with the present invention under control of two concurrently running processes in a time-shared operating system environment providing synchronous input/output requests. Process 1 in computer memory 12 issues requests to read from disc through disc controller 10 into its single buffer area, and issues requests to write from the buffer to tape via tape controller 14. Similarly, independent concurrent process 2 issues disc read requests and tape write requests for its own buffer area. To keep order and prevent interference with one another, each process notifies the other of read and write completion by means of interprocess communication provided by the operating system. In the present embodiment, this is provided by two "pipes". A pipe is a facility by which a process may issue an ordinary synchronous write of data to be read by a second process using an ordinary synchronous read without incurring the delay of actual input and output. The operating system provides buffer space and administers the first-in-first-out data transfer between the reading and writing processes within computer memory.

In alternative embodiments, the required interprocess communication may be implemented by any of a variety of facilities. One such facility is a common memory area accessible to both processes. Each process writes information intended for the other process into a previously agreed upon memory area where it is found by the other process. Another such facility entails the use of semaphores. A semaphore is a memory location that contains a numerical value administered by the operating system. The numerical value of the semaphore may be tested by a process, or the process may arrange to be notified by the operating system when the semaphore takes on certain values. Still other interprocess communication mechanisms may be employed in the present invention without departing from the scope of the invention, as will be evident to those skilled in the art.

Figure 4:
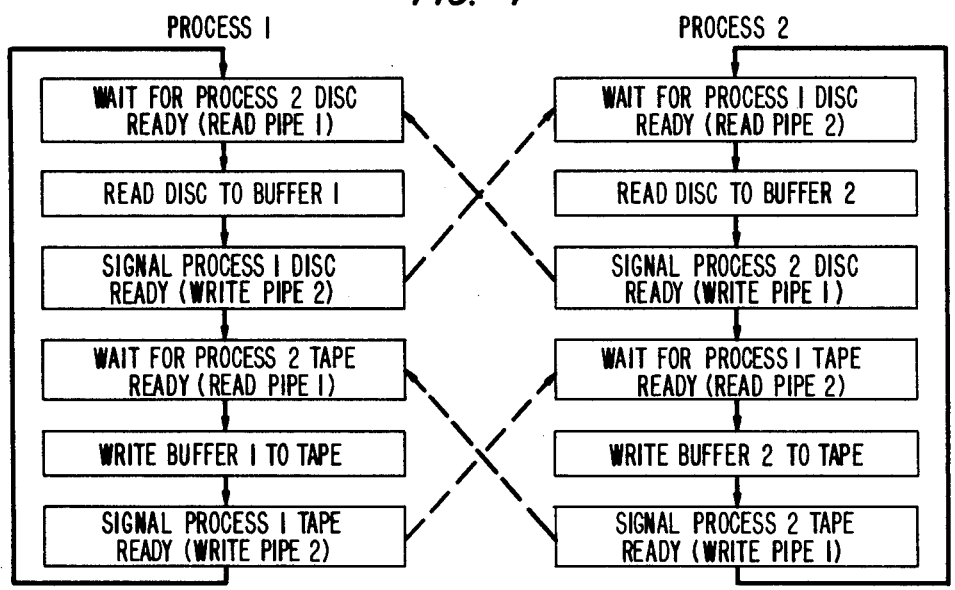
FIG. 4 is a flow chart of the inventive method used in FIG. 3.

FIG. 4 is a flow diagram showing the procedures followed by the two concurrently running processes of FIG. 3. Process 1 first waits for disc controller 10 to be idle so that process 1 can read from disc into its buffer area. The wait for disc ready is not an explicit test for an idle condition of disc controller 10 but is instead a synchronous read of a first pipe that is written by process 2 when its read of disc is completed. Since the read of pipe 1 is synchronous, the read request returns to process 1 only after process 2 has signaled disc ready. Process 1 then reads from disc to buffer 1. This synchronous read returns to process 1 only after buffer 1 has been filled so that the disc is ready. Process 1 then signals disc ready by writing an appropriate control character to a second pipe. Process 1 is now ready to write to tape, and waits for tape ready by reading pipe 1 for a control character placed there by process 2 after its write to tape. Following the receipt of tape ready, process 1 writes buffer 1 to tape, then signals tape ready by writing an appropriate control character on pipe 2 to be read by process 2 before writing buffer 2 to tape. Process 1 then completes the loop, reiterating the above steps.

Process 2 executes a sequence of operations similar in all respects to that of process 1 except that process 2 reads from pipe 2 and writes on pipe 1 in order to communicate with process 1. Also, of course, process 2 has its separate buffer area.

Omitted from FIG. 4 are the initialization steps performed by the processes prior to entering the main copying loop as well as the termination steps undertaken after copying is complete. Also omitted are endof-file tests within the main loops of process 1 and process 2 to determine when copying is complete.

Figure 5:
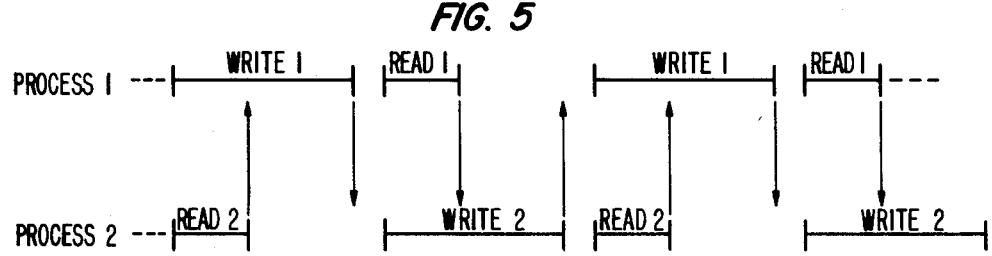
FIG. 5 is a timing diagram illustrating the overlapped input/output of the illustrative embodiment.

FIG. 5 is an illustrative timing diagram that shows time overlap of the read and write operations. The top horizontal line corresponds to read and write activities undertaken by process 1. FIG. 5 shows the case where the write operation is of longer duration than the read operation and illustrates that copying can take place no faster than the slower operation permits. Thus process 1 writes, then process 2 writes, then process 1 writes and so forth. Alternating reads by the two processes overlap the writes. Brief periods of delay appear between each read and write operation by the same process. These account for delays incurred by program execution time, disc latency, tape inter-record gap creation, and so forth. At the end of each read and write operation a vertical arrow shows the time and direction of the interprocess "ready" signal that provides notification to the other process.

The illustrative embodiment set forth in the figures shows copying from disc to tape. However, the present invention is not limited to this application, but may be employed to copy data from any source to any destination or from any device to any other such as from tape to disc, disc to disc, punch card to printer, paper tape to display screen, low speed memory to high speed communication line, or any other similar or dissimilar I/O devices wherein double buffered overlapped I/O may be desirable.

The APPENDIX contains a computer program embodiment illustrative of the present invention. The program is complete and is written in the C programming language (See *The C Programming Language,* by Kerninghan and Ritchie, Prentice-Hall, 1978). It may be executed under any of several time-shared operating systems commercially available including, for example, an operating system available from American Telephone and Telegraph Company under the tradename UNIX. Suitable computer system hardware is commercially available from Digital Equipment Corporation, ("DEC") marketed under the tradename PDP 11/70.

The computer program in the APPENDIX may be typed directly into the system and stored in a file given the name "program.c". This program then may be compiled using the C language compiler by giving the command line:

| cc | -o | program | program.c | which causes the operating system to compile the program and place the executable result in an output file named "program". The program may then be executed by giving the command line:

| program | </dev/rrp0 | >/dev/rmt0 | which causes the operating system to execute the program appearing in the file named "program" while using a device named "/dev/rrp0" as input (typically a disc device, e.g. DEC Model RP06) and a device named "/dev/rmt0" as output (typically a tape device, e.g. DEC Model TE16). Execution will result in two concurrently running processes that will copy from disc to tape in the manner described above. The program will not be described in detail.

Line 1 reserves a buffer area of 25,600 characters.

Lines 2 and 3 reserve four integer storage locations with names pipe1_r, etc.

Line 4 reserves two integer locations for the storage array yyy.

Line 5 reserves four integer storage locations with the names processid, etc.

Line 6 begins the main program which extends from line 7 to line 43.

Line 8 is the first executable statement of the program. Line 8 is a request to the operating system to create a first pipe, pipe 1, which will later be used for interprocess communication. Identification numbers called file descriptors will be returned in the two locations of array yyy.

Line 9 obtains the file descriptor of the read side of the first pipe from array yyy and stores it in storage location pipe1_r. Line 10 obtains the file descriptor for the write side of the first pipe and stores it away in the storage location pipe1_w.

Line 11 is a request to the operating system to create a second pipe, pipe 2. Lines 12 and 13 store away the read and write file descriptors of the second pipe in storage locations pipe2_r and pipe2_w, respectively.

Line 14 is a request to the operating system to write two characters into pipe 1, a first character "r" followed by a second character "r". These two characters indicate, respectively, that the input device is ready for reading and that the output device is ready for writing, thereby initiating the first copy operation of the main loop of process 1.

Lines 15 and 16 assign the values 0 and 1 to the variable storage locations "input" and "output", respectively, The variable "input" is used as the file descriptor for the standard input in the read statements appearing in lines 23 and 35—a disc device having the name dev/rrp0 in the above suggested use. The contents of the variable "output" are used as the file descriptor for the standard output in the write statements at lines 26 and 38—a tape device having the name /dev/rmt0 in the above suggested use.

Line 17 is a request to the operating system to fork and return a process identifier in the variable location process_id. A "fork" system request causes the operating system to create a new, concurrently operating process virtually identical in all respects to the process that requests the fork. After the execution of line 17 there are two independent concurrent processes in operation, two independent instances of the program shown in the APPENDIX. The only important difference between the two processes is the contents of the location process_id. Each process can read and write the same files and the same pipes using the same file descriptors. As a result of the common file descriptors, a sequence of read requests by the two processes yields a sequence of data in the order it appears in the input file. Each process has its own copy of each storage location, as well as its own area reserved for a 25,600 character buffer.

Line 18 tests the process_id to determine if it is equal to 0. For the newly created (child) process, process_id will contain 0. As a result, the child process (process 1 in FIG. 4) will execute the statements appearing in lines 19 through 29.

Line 30 is an "else" statement, the companion to the "if" statement of line 18. In the original process (parent), process_id contains a non-zero value. Therefore, the parent (process 2 in flow chart of FIG. 4) will skip from line 18 to the statement at line 31 and execute the program statements appearing at lines 31 through 41.

Lines 19 and 20 are requests to the operating system to close pipe 1 for writing and pipe 2 for reading, respectively. These two lines are executed only in process 1. Process 1 will send signals to process 2 by writing to pipe 2 and will receive signals from process 2 by reading from pipe 1. The unused means of access to these two pipes are closed off.

Lines 31 and 32 close pipe 1 for reading and close pipe 2 for writing. These two lines are executed only in process 2. Process 2 will signal process 1 by writing to pipe 1 and will receive signals from process 1 by reading from pipe 2. The unused means of access to these pipes are closed off.

Line 21 is executed only in process 1. The "while" statement is an iteration statement that causes the statements at lines 22 through 27 to be executed in sequence and then repeated over and over. This is the main copy loop of process 1.

Line 33 is executed only in process 2. This iteration statement causes the statements at lines 34 through 39 to be executed repeatedly to form the main copy loop of process 2.

The six read and write statements appearing at lines 22 through 27 correspond to the six steps of the flow diagram for process 1 appearing in FIG. 4. The six read and write statements appearing at lines 34 through 39 correspond to the six steps in the flow diagram for process 2 of FIG. 4. The read statement of line 23 is enclosed by an "if" statement which is the end-of-file test for termination of the copy operation. If the read statement in line 23 returns a value less than or equal to zero the end-of-file condition of the "if" statement is met and the "break" statement is executed. This causes control to drop out of the "while" loop and proceed to line 29.

Line 29 is a request to the operating system to terminate the current process, process 1, after closing all open files, thus providing a graceful exit for process 1 when data to be copied from the input device has been exhausted.

Similarly, line 35 contains an "if" statement that causes a "break" upon end-of-file for process 2. Line 41 is executed on end-of-file and process 2 is terminated after all open files are closed.

Line 22 reads one character from pipe 1 and places it in location xxx. During the first execution of the copy loop the first character read is the first "r" placed in pipe 1 by the statement at line 14. During subsequent iterations of the copy loop, the character read by line 22 is the "r" written by the statement at line 36 by process 2 upon completion of the read at line 35.

Line 23 includes a read statement that reads 25,600 characters into the buffer area of process 1 from the standard input.

Line 24 is executed after the completion of line 23 and writes a single character into pipe 2 to signal read completion. This character is read by process 2 at line 34 which reads a single character from pipe 2 and places it in location xxx. This character signals process 2 to begin the read at line 35.

Line 25 reads a character from pipe 1 and places it in location xxx. The first time statement 25 is executed, the character read is the second "r" placed in pipe 1 by the write statement at line 14. During subsequent iterations line 25 reads a character placed in pipe 1 by process 2 by the write statement of line 39 upon the completion of the write statement at line 38.

Line 26 writes 25,600 characters from the buffer of process 1 to the standard output.

Line 27 then writes a single character to pipe 2 to indicate write completion. This character is read by process 2 with the statement at line 37, and signals process 2 to begin the write at line 38.

It is understood that the above-described embodiment is merely illustrative of the principles of my invention; other arrangements may be devised by those skilled in the art without departing from the spirit and scope of the invention.

APPENDIX

```
1   char        buffer[ 25600 ];
2   int         pipe1_r, pipe1_w;
3   int         pipe2_r, pipe2_w;
4   int         yyy[ 2 ];
5   int         process_id, xxx, input, output;
6   main ( )
7   {
8               pipe( yyy );
9               pipe1_r = yyy[ 0 ];
10              pipe1_w = yyy[ 1 ];
11              pipe( yyy );
12              pipe2_r = yyy[ 0 ];
13              pipe2_w = yyy[ 1 ];
14              write( pipe1_w, "rr", 2 );
15              input = 0;
16              output = 1;
17              process_id = fork( );
18              if( process_id == 0 ) {
19                  close( pipe1_w );
20                  close( pipe2_r );
21                  while( 1 ) {
22                      read ( pipe1_r, xxx, 1 );
23                      if( read( input, buffer, 25600 ) <= 0 ) break;
24                      write( pipe2_w, "r", 1 );
25                      read( pipe1_r, xxx, 1 );
26                      write( output, buffer, 25600 );
27                      write( pipe2_w, "r", 1 );
28                  }
29                  exit( 0 );
30              } else {
31                  close( pipe1_r );
32                  close( pipe2_w );
33                  while( 1 ) {
34                      read( pipe2_r, xxx, 1 );
35                      if( read( input, buffer, 25600 ) <= 0 ) break;
36                      write( pipe1_w, "r", 1 );
37                      read( pipe2_r, xxx, 1 );
38                      write( output, buffer, 25600 );
39                      write( pipe1_w, "r", 1 );
40                  }
41                  exit( 0 );
42              }
43  }
```

What is claimed is:

1. In a computer system, the method of copying data from an input device to an output device using two concurrently running computer processes, each performing steps comprising
    testing to determine read completion by the other process,
    reading data from the input device,
    signaling the other process of read completion,
    testing to determine write completion by the other process,
    writing data to the output device, and
    signaling the other process of write completion.

2. The method of claim 1 wherein
    said reading step further comprises the step of
    reading a quantity of data from the input device into a buffer area, and said writing step further comprises the step of writing said quantity of data from said buffer area to the output device.

3. The method of claims 1 or 2 wherein one of said two processes further performs the initial steps of signaling the other process of an initial read completion, and signaling the other process of an initial write completion.

4. In a computer system, the method of transferring data from a data source to a data destination using two concurrent processes, each repeatedly performing steps comprising waiting for an indication of input completion by the other process, inputting data from the data source, sending an indication of input completion to the other process, waiting for an indication of output completion by the other process, outputting data to the data destination, and sending an indication of output completion to the other process.

5. The method of claim 4 wherein said inputting step further comprises the step of inputting a quantity of data from the data source into a buffer area, and said outputting step further comprises the step of outputting said quantity of data from said buffer area to the data destination.

6. The method of claims 4 or 5 wherein one of said two processes further performs the initial steps of sending an indication of an initial input completion, and sending an indication of an initial output completion.

7. In a computer system, the method of transferring data from a data source to a data destination using two concurrently running processes, each process including a buffer, comprising the following steps for each process transferring data from the data source to the process buffer, transferring data from the process buffer to the data destination, and communicating with the other process upon completion of each said transfer.

8. In a computer system, the method of copying data from an input device to an output device using first and second concurrent processes comprising the steps of repeatedly, in the first process;

transferring data into a first buffer from the input device, transferring data from said first buffer to the output device, and communicating with the second process upon completion of each said transfer, and repeatedly, in the second process;

transferring data into a second buffer from the input device, transferring data from said second buffer to the output device, and communicating with the first process upon completion of each said transfer.

9. In a computer system, the method of copying from a first device to a second device using first and second concurrently running processes performing the steps comprising in the first process;

testing to determine input completion by the second process, reading data from the input device, signaling the second process of input completion, testing to determine output completion by the second process, writing data to the output device, signaling the second process of output completion, and in the second process;

testing to determine input completion by the first process, reading data from tne input device, signaling the first process of input completion, testing to determine output completion by the first process, writing data to the output device, and signaling the first process of output completion.

* * * * *

UNITED STATES PATENT AND TRADEMARK OFFICE
CERTIFICATE OF CORRECTION

PATENT NO. : 4,470,115

DATED : September 4, 1984

INVENTOR(S) : Larry A. Wehr

It is certified that error appears in the above—identified patent and that said Letters Patent is hereby corrected as shown below:

Column 1, line 20, "house" should read --hours--.
Column 3, line 1, "shown" should read --shows--.
Column 6, line 6, "processid" should read --process_id--;
lines 32 and 33, "respectively," should read --respectively.--;
line 36, "dev/rrp0" should read --/dev/rrp0--.
Column 10, line 39, "tne" should read --the--.

Signed and Sealed this

*Twenty-sixth* Day of *February 1985*

[SEAL]

*Attest:*

DONALD J. QUIGG

*Attesting Officer*     *Acting Commissioner of Patents and Trademarks*